United States Patent [19]

Mylvaganam et al.

[11] Patent Number: 4,914,959
[45] Date of Patent: Apr. 10, 1990

[54] ULTRASONIC FLOW METER USING OBLIQUELY DIRECTED TRANSDUCERS

[75] Inventors: Kanagasaba Mylvaganam, Skjoldtun; Erling Hammer, Mjølkeraen, both of Norway

[73] Assignee: Den Norske Stats Oljeselskap A.S., Stavanger, Norway

[21] Appl. No.: 312,588

[22] PCT Filed: Apr. 20, 1988

[86] PCT No.: PCT/NO88/00030
§ 371 Date: Feb. 3, 1989
§ 102(e) Date: Feb. 3, 1989

[87] PCT Pub. No.: WO88/08540
PCT Pub. Date: Nov. 3, 1988

[30] Foreign Application Priority Data
Apr. 24, 1987 [NO] Norway ................................. 871701

[51] Int. Cl.[4] ............................................. G01F 1/66
[52] U.S. Cl. ............................. 73/861.28; 73/861.18
[58] Field of Search ........... 73/861.18, 861.27, 861.28, 73/861.29, 865.5; 310/326, 336

[56] References Cited

U.S. PATENT DOCUMENTS

| | | |
|---|---|---|
| 3,204,458 | 9/1965 | Gillen . |
| 3,218,852 | 11/1965 | Scarpa et al. . |
| 3,469,445 | 9/1969 | Moffatt . |
| 3,834,233 | 9/1974 | Willis et al. . |
| 3,835,704 | 9/1974 | Elazar et al. . |
| 3,890,423 | 6/1975 | Zacharias, Jr. ............... 310/336 |
| 4,326,274 | 4/1982 | Hotta et al. . |
| 4,397,193 | 8/1983 | Ryan et al. . |
| 4,454,767 | 6/1984 | Shinkai et al. ............... 73/861.18 |
| 4,556,814 | 12/1985 | Ito et al. . |

FOREIGN PATENT DOCUMENTS

| | | |
|---|---|---|
| 147718B | 11/1984 | Denmark . |
| 0178346 | 4/1986 | European Pat. Off. . |
| 1773777 | 4/1972 | Fed. Rep. of Germany . |
| 896806 | 3/1945 | France . |
| 1530347 | 10/1978 | United Kingdom . |
| 2101318 | 1/1983 | United Kingdom . |
| WO88/08539 | 11/1988 | World Int. Prop. O. . |

OTHER PUBLICATIONS

Lynnorth, L. C., "Clamp on Ultrasonic Flowmeters", Instrumentation Technology, vol. 22, No. 9, pp. 37-44, Sep. 1975.

Derwent's Abstract, 87-219534/31 SU 1,273,740 published 30-Nov.-1986; "Ultrasonic Single-Channel Method of Flow Measurement-by Vectorial Summation of Signal Envelopes Which Monitor the Flow".

Derwent's Abstract, 84-106438/17 SU 1,030,656 published 23-Jul.-1983; "Liquid Media Ultrasonic Flowmeter-Uses Two Electroacoustic Propagation Speed Measurements in Pipe and Liquid".

"Theoretical Analysis of the Basic Parameters of Ultrasonic Flowmeters" by N. I. Brazhnikov (Translated from Izmeritel'naya Teknika), No. 8, pp. 57-62, Aug., 1966.

"High-Rangeability Ultrasonic Gas Flowmeter for Monitoring Flare Gas" by K. S. Mylvaganam, Reprinted from IEEE Transactions on Ultrasonics, Ferroelectronics and Frequency Control, vol. 36, No. 2, 1989.

*Primary Examiner*—Charles A. Ruehl
*Attorney, Agent, or Firm*—Foley & Lardner, Schwartz, Jeffery, Schwaab, Mack, Blumenthal & Evans

[57] ABSTRACT

A transducer system and method is provided for ultrasonic measurement of the flow velocity of a fluid in a pipe. Two transducers are mounted on opposite sides of a pipe, the second transducer being downstream from the first. The two transducers alternately transmit and receive ultrasonic pulses along respective center axes which are deviated upstream from an imaginary line connecting the transducers.

9 Claims, 3 Drawing Sheets

FIG. I

ULTRASONIC FLOW METER USING OBLIQUELY DIRECTED TRANSDUCERS

BACKGROUND OF THE INVENTION

1. Field of the Invention

This invention relates to a ultrasonically operating transducer device for the measurement of the flow velocity of a fluid in a pipe, comprising two transducers mounted on either side of the pipe and directed obliquely in relation to the direction of the flow, which transducers alternately transmit and receive sonic pulses to and from each other.

2. Discussion of the Related Art

The invention is especially developed in connection with the need for measuring the gas flow in a so-called flare in connection with facilities for exploration and production of hydro carbons, but it is not limited to such a utilization.

There is a need to be able to cover, with one transducer arrangement, a relatively wide range of flow velocities in an accurate manner, while there is also a need for safety, particularly when measuring in hazardous areas.

The transducer devices known today, of the kind mentioned initially, have the disadvantage that the measurable range of velocity is relatively limited. Also, the accuracy of measurement is not always completely satisfactory. In the case of measuring in hazardous areas (for example, where there is a danger of explosion) it is necessary to transmit signals for evaluation to a safety zone. This transmission of signals will often disturb the measurements, because the signals are exposed to electromagnetic influences from the environment during the required transmission through cables.

SUMMARY OF THE INVENTION

According to the present invention, two transducers are arranged with their center axes deviating from the imaginary connecting line between the transducers in a direction against the mentioned direction of flow of the fluid, the flow velocity of which is to be measured. A wider range of measurement is thus achieved because the divergent orientation of the transducers compensates for the deviation of the ultrasonic beam between the transducers, which will affect the sonic pulses in the fluid flow.

According to the invention, in connection with intended utilization of the new transducer device for measuring the velocity of a gas flow in a pipe leading to a flare, it has been found that the imaginary connecting line can advantageously form an angle of approximately 55° in relation to the flow direction, and that the deviation for the respective transducers will be approximately 7°–10°.

With such a deviation of orientation of the two transducers, which deviation of orientation is independent of the diameter of the pipe, a potential measurement range of 0 to approximately 100 meters/second can be covered with only one transducer device according to the invention.

Further, according to the invention, it has been found that in a range of low flow velocities, preferably from 0 to 7 meters/second, a CW-signal (continuous wave signal) can be utilized in combination with a CHIRP-signal (a signal with rectangular pulse whose momentary frequency increases linearly throughout the duration of the pulse), while for medium and higher flow-velocities preferably, over 7 meters/second and up to over 100 meters/second, a CHIRP-signal with correlative detection is used.

By using two signal systems in this way a broad measurement range is achieved in a very advantageous manner. For high and medium rates of flow velocity, a CHIRP-signal with correlation 2 detection is used in order to overcome high levels of noise, while a CW-phase measurement in combination with the CHIRP-measurement is used for the lower velocity. The CHIRP-signals are sent upstream and downstream in order to roughly determine the flow-velocity value, followed by CW-bursts which increase resolution. The omission of the CW-measurement for flow-velocities over 7 meters/second enables a doubling of the bandwidth for the CHIRP-measurements.

According to the invention it can be advantageous to use, as respective transducers, a transducer which is designed as a cup-shaped metal body whose base as membrane is assigned an electrode on its inside and which is sealed off against the fluid-flow, the cup-wall of which is designed with an annulus filled with a powerful damping material, for example epoxy, rubber or epoxy mixed with metal particles. The annulus can advantageously be open towards the outside of the cup-base, and in a particularly advantageous embodiment the cup-shaped metal body is made of titanium, since such an embodiment makes it especially suitable for use in connection with gas flows.

Transducers of this type make it feasible to transmit signals over long distances in air or gas with very low so-called ringing compared with other, commercially available ultra-sonic transducers. Moreover, a transducer of this type will be intrinsically safe and can therefore be utilized for instance in the case of flow-measurement of explosive gases.

An advantageous transducer arrangement according to the invention can comprise a transmitter and a receiver connected to each transducer, where each such transmitter and receiver has an optical receiver part and an optical transmitter part. A first multiplexer is connected to the two transmitters through optical fibres, and a second multiplexer is connected to the two receivers through optical fibres.

A CHIRP-generator and a CW-generator are connected to the first multiplexer, a CHIRP-correlator and a CW-detector are connected to the other multiplexer, while a clock and sequence-generator are connected to the multiplexers, the CHIRP-generator, the CW-generator, the CHIRP-correlator, the CW-correlator and CW-detector. A computer is connected to the generator, the CW-detector and the CHIRP-correlator.

The use of the optical fibres here is particularly important. The use of these will make "the communication channel" between the point of measurement and the control-room virtually immune to interfering signals of the type which might cause interference in a normal electric transmission by cable.

BRIEF DESCRIPTION OF DRAWINGS

The invention will be explained more closely with reference to the drawings, where.

DETAILED DESCRIPTION OF THE PREFERRED EMBODIMENT

Figure 1:
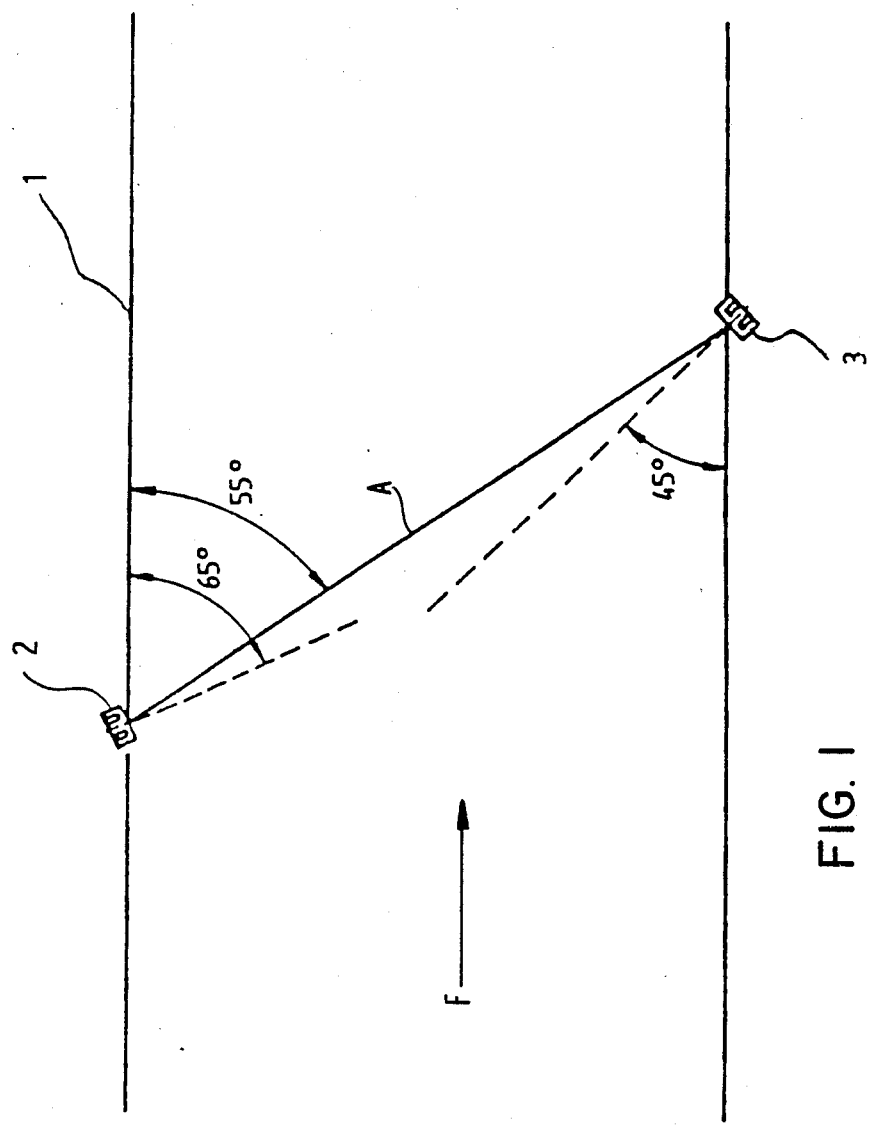
FIG. 1 shows a schematic longitudinal section through a pipe with two transducers placed diagonally in respect of each other.

In FIG. 1 a pipe 1 for the transportation of gas is shown. In the pipe wall a transducer 2 is mounted and a second transducer 3 is obliquely mounted in the opposite pipe wall downstream from the first transducer 2. The two transducers 2, 3 are orientated in such a way in relation to the direction of flow of the gas in the pipe 1, indicated by the arrow, so that the imaginary connection line A as indicated in FIG. 1 forms an angle of 55° with respect to the direction of the flow F. The tranducer 2, which transmits co-currently, forms an angle of 65° in relation to the flow direction F, and deviates, then, 10° from the connecting line. The transducer 3, which is the transducer which transmits counter-currently, has a corresponding deviation of 10° from the connecting line A and thus forms an angle of 45° with respect to the flow direction F. As is indicated in FIG. 1, both directions of deviation are placed on the upstream side of the imaginary connecting line A.

The values indicated in FIG. 1 represent an optimisation which will make it feasible to cover at least a range of velocities from 0–80 meters/second in the pipe 1.

As mentioned, very good measurements are achieved if, with the shown orientation of the transducers, a CW-signal is used in combination with a CHIRP-signal in a lower flow-velocity range, preferably from 0–7 meters/second, whilst for medium and higher flow-speeds, up to 77–100 meters/second, a CHIRP-signal with correlation detection is used. A processing system which makes this possible is shown in FIG. 2.

Figure 2:
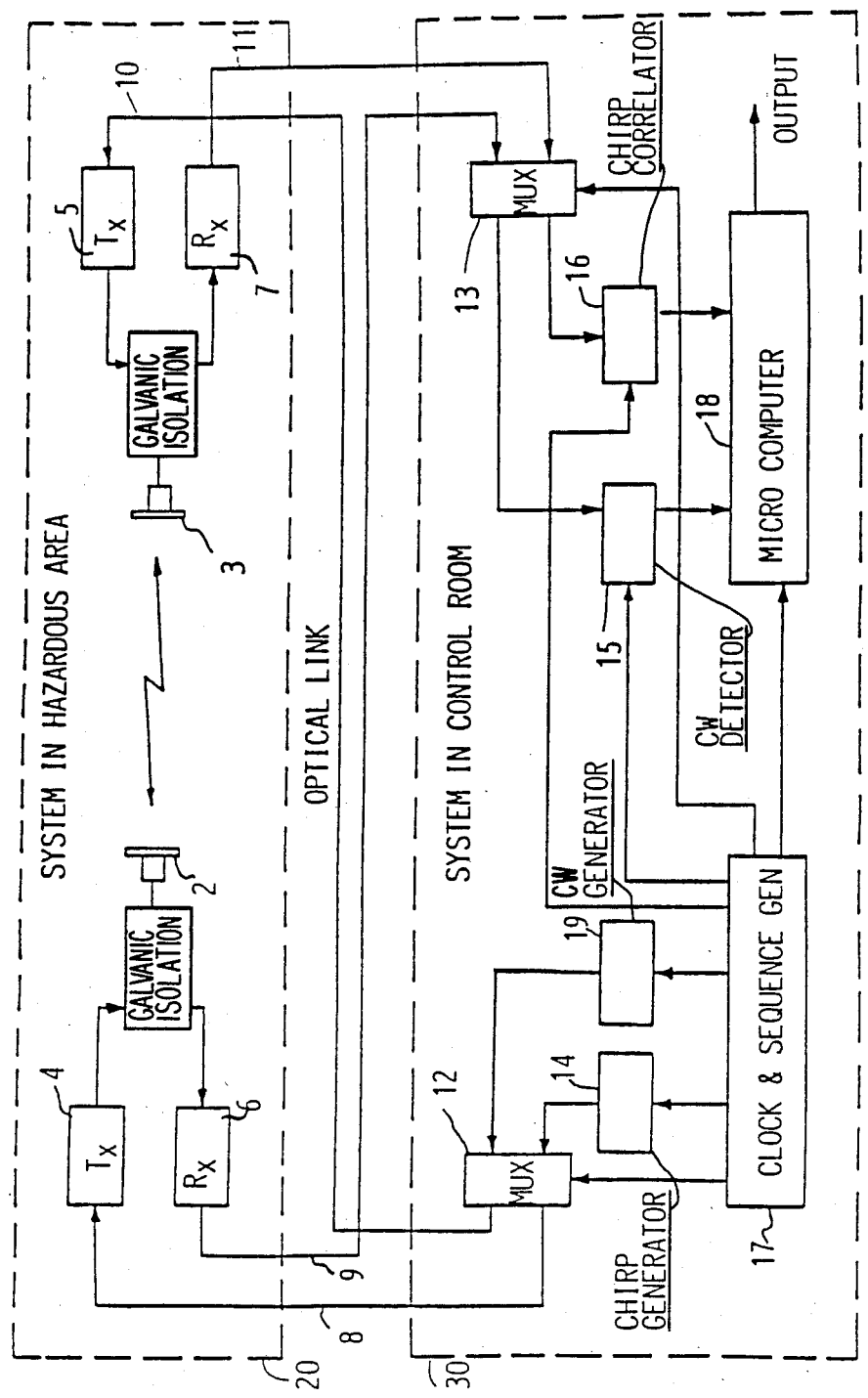
FIG. 2 shows a processing system for the transducer device according to the invention.

In the block diagram shown in FIG. 2, the two transducers 2 and 3 are shown located in a so-called hazardous area (where there is danger of explosion), indicated by surrounded by a broken line 20. Each transducer 2, 3 is as shown galvanicaly isolated and is connected to a respective transmitter and receiver 4, 5 and 6, 7. Each such transmitter and receiver comprises an optical receiver unit and optical transmitter unit and is connected by means of optical fibres 8, 9, 10 and 11 to a first multiplexer 12 and a second multiplexer 13 respectively. The optical fibres 8, 9, 10 and 11 form the optical connection between the hazardous area where the transducers are placed, and a control room 30 which is situated in a safe area. In addition to the two multiplexers 12, 13, a CHIRP-generator 14, a CW-generator 19, a CW-detector 15 and a CHIRP-correlator 16, together with a clock and sequence generator 17 and a computer 18, are all to be found in the control room.

As can be seen from FIG. 2, the CHIRP-generator 14 and the CW-generator 19 are connected to the first multiplexer 12. The CW-detector is connected to the second multiplexer 13, and the CHIRP-correlator 16 is connected to the second multiplexer 13. The clock and sequence generator 17 is as shown connected to both of the multiplexers 12, 13, the CHIRP-generator 14, the CW-generator 19, the CW-detector 15, the CHIRP-correlator 16 and the computer 18, which is also connected to the CW-detector 15 and the CHIRP-correlator 16.

The flow meter provided by the invention is a transit time-difference meter. The principle of measurement is based on the fact that the propagation velocity of an ultra-sonic pulse in a moving medium, will be modulated by the velocity of the medium in the direction of propagation. When two ultra-sonic transducers are directed towards each other with an angle of $\theta$ in relation to the flow direction, the flow velocity of the medium can be calculated by means of the following equation $$U_x = \frac{D}{\sin 2\theta} \cdot \frac{t_{32} - t_{23}}{t_{23} \cdot t_{32}}$$

where
  $\bar{U}_x$ = the flow velocity along the axis of the pipe
  D = the pipe diameter
  $\theta$ = the angle of the connecting lines relative to the flow direction or the axis of the pipe
  $t_{23}$ = the transit time from the transducer 2 to the transducer 3 (downstream) and
  $t_{32}$ = the transit time from the transducer 3 to the transducer 3 (upstream).

Figure 3:
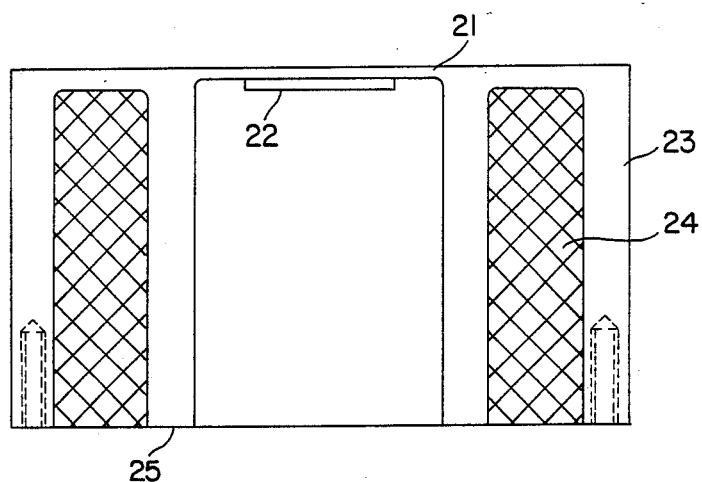
FIGS. 3 and 4 show two embodiments of the transducers.
Figure 4:
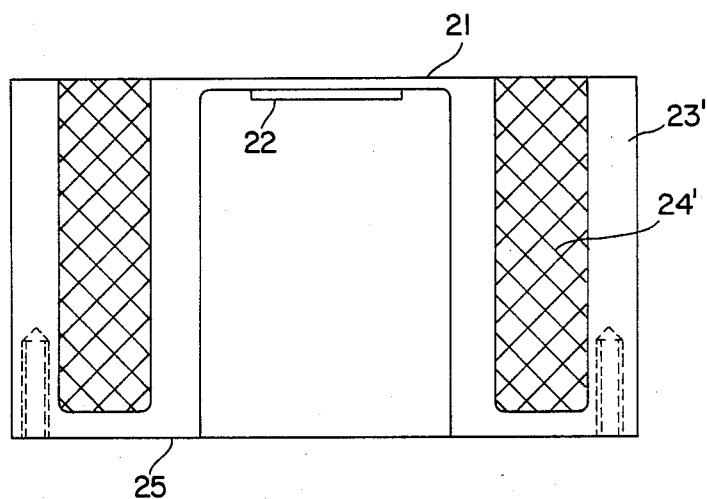

The counter propagating ultra sonic pulses are advantageously generated with transducers of the type shown in FIGS. 3 and 4. These transducers are intended for operation at 80 kHz center frequency. The transducers are intended for use in an explosive environment. The energy supply for the transducer excitation is an electric power supply which is available in the vicinity of the measurement area. The transmission of the modulated signals from the transducers is controlled from the control room, and the communication link between the transducers at the point of measurement and the signal processing and calculation unit in the control room takes place, as mentioned, by means of optical fibres. Use of optical fibres provides for an optimal arrangement because the "channel" which the optical fibres create between the transducers and the control room, will be a communication channel which is immune to any form of electromagnetic noise from the environment. Such electro-magnetic moise can be caused for instance by radio waves, switching on and off of electrical appliances and possibly also coupling between other electrical lines. The optical connection between the transducers at the point of measurement and the control room therefore functions as a block against many interfering signals from the environment. Signal transmission by means of optical fibres also guarantees complete galvanic isolation. By utilizing optical fibres the length of transmission without signal degradation can reach up to 1000 meters.

The actual transducers are vital elements and as mentioned, the transducers shown in FIGS. 3 and 4, which are variations of each other, are suitable for use in the transducer device according to the present invention. The transducers shown in FIGS. 3 and 4 enable long range transmission of signals in air or gas with very low ringing compared with many commercially available ultra-sound transducers.

The transducer 2 shown in FIG. 3 is shown in section and is (as indicated) cup-formed. The base 21 of the cup is machined so that it forms a membrane. On the inside of the cup base or membrane 21 a suitable piezo-electric element 22 is mounted. The actual housing 23 can then serve as one electrode, while the free end of the piezo-electrical element can be used as the other electrode for electrical excitation of the transducer.

As shown in FIG. 3 the side wall of the cup 23 is machined so that an annulus 24 is formed. This annulus is so deep that it extends from the mounting side of the transducer to the same level as the membrane 21. The annulus 24 is filled with a powerful damping material.

Such a damping material can be for example epoxy, rubber or epoxy compounded with metal particles.

The entire transducer housing 23 can, in a hermetically sealing manner, be coupled to a support (not shown) on the mounting side 25, so that the electrical contacts can be prevented from being exposed to the environment in which the transducer is to operate. This is of course particularly advantageous when the transducer is used in an explosive environment.

The operational frequency of the transducer can be decided by choosing suitable dimensions for the piezoelectric element 22 and the thickness of the metal membrane 21. The transducer shown in FIG. 3 can then be designed to cover normal sonic frequencies and ultrasonic frequencies.

A metal material for the transducer cup 23 is chosen according to the demands which are made of the transducer (environmental demands). Titanium, steel, aluminium, carbon fibre and other materials can thus be used for the transducer housing 23.

The membrane embodiment which is employed provided a good coupling to a gas medium. There is a relatively large amount of metal mass at the edge of the membrane in order to achieve the desired boundary conditions and to prevent too strong a coupling to the housing. The coupling to the housing will cause noise and the effect of the noise can be suppressed advantageously by means of the built-in damping material in the annulus 24.

The embodiment in FIG. 4 mainly corresponds to the embodiment in FIG. 3 and the difference being that the annulus 24' is machined out from the membrane side and not from the mounting side 25. The same reference numbers as in FIG. 3 are therefore used, but with the addition of an index for the reference numbers 23 and 24 which refer to the housing and the annulus.

The CHIRP-signal which is utilized is a rectangular pulse whose momentary frequency increases linearly during the length of the pulse. The output for the correlator in the receive will be a compressed pulse. The maximum amplitude in the correlator output is detected by a peak-detector and the transit time is measured from the end of the transmission and until the detection of the correlation top.

The CW-signal is supplied in bursts, for example with a frequency of 67.5676 kHz. The duration of such a signal will then be 14.8 sec. A problem arises when there are large variations in the transit times, in which case the phase detector output will repeat itself at intervals corresponding to the period, that is 14.8 sec. In order to achieve a reliable result, it is therefore necessary to know the number of full CW-periods in the transit time. The results of the CHIRP-measurement can then be used here in order to determine this number, while the CW-measurement provides the fractions.

The mean of the CW-phase measurement is calculated from 128 periods of the signal. In order to achieve a correct result, it will be necessary for each mesurement to be within the same period of the reference signal. In order to achieve this two detection systems are used. The relative phase for the received signal in relation to the reference signal is detected prior to the measurement and in-phase or out of phase measurement is chosen.

The transit time difference $\delta t$, i.e. $t_{32} - t_{23}$ in the formula for the flow velocity $\overline{U}_x$ above, is determined in the computer on the basis of the combined CW- and CHIRP-measurements. The flow velocity is then calculated by means of $\delta t$ and the transit time from the CHIRP-measurement.

We claim:

1. A transducer device for ultrasonic measurement of flow velocity of fluid in a pipe, comprising:
   at least a first and second transducer each disposed on opposite sides of said pipe;
   said second transducer being located downstream from said first transducer;
   said transducer transmitting and receiving sonic pulses about center axes thereof, wherein the center axes are deviated upstream from an imaginary line connecting said transducers.

2. Transducer device according to claim 1, wherein the imaginary connecting line forms an angle of approximately 55° to the flow direction, and the deviation for the respective transducer from said imaginary connecting line is approximately 10°.

3. Transducer device according to claim 1, wherein in a range of flow velocity from about 0–7 meters/second, a CW-signal in combination with a CHIRP-signal is used, while in the case of ranges of flow velocity over about 7 meters second and up to about 77–100 meters/second, a CHIRP-signal with correlation detection is used.

4. Transducer device according to claim 1, wherein each said transducer comprises, a cup-shaped metal body whose base forms a membrane having a piezoelectric element on an inside surface thereof, which is sealed off from the flow, and whose cup-wall is designed with an annulus filled with a powerful damping material.

5. Transducer device according to claim 4, wherein the annulus is open towards an outside of the cup base.

6. Transducer device according to claim 4, wherein the annulus is open towards the top of the cup.

7. Transducer device according to claim 4, wherein the cup-formed metal body is made of titanium.

8. Transducer device according to claim 1, wherein each transducer is connected to a transmitter and a receiver with an optic receiver part and an optic transmitter part,
   a first multiplexer is connected to the two transmitter through optical fibres,
   a second multiplexer is connected to the two receivers through optical fibres,
   a CHIRP-generator and a CW-generator are connected to the first multiplexer,
   a CW-detector and CHIRP-correlator are connected to the second multiplexer, a clock and sequence generator is connected to the multiplexers, the CHIRP-generator, the CW-generator, the CW-detector and the CHIRP-correlator, and a computer are connected to the sequence generator, the CW-detector and the CHIRP-correlator.

9. A method of ultrasonic measurement of flow velocity of a fluid along a flow axis in a pipe, comprising the steps of:
   mounting at least a first and second transducer on opposite sides of said pipe, said second transducer being mounted downstream from said first transducer;
   alternately transmitting and receiving sonic pulses about center axes of said transducers, said center axes being deviated upstream from an imaginary line connecting said transducers; and
   calculating the velocity of the fluid using the formula:

$$U = \frac{D}{\sin 2\theta} \cdot \frac{t_{32} - t_{23}}{t_{23} \cdot t_{32}}.$$

where:

$\overline{U}$ is the mean flow velocity along the flow axis of the pipe,

D is the pipe diameter, $\theta$ is the angle between the imaginary connecting line and the flow axis, $t_{23}$ is the downstream transit time, and $t_{32}$ is the upstream transit time.

* * * * *